July 28, 1936.                E. D. JANES                2,048,744
                        RESILIENT ATTACHING CLIP
                          Filed Nov. 11, 1935

INVENTOR
Edmund D. Janes,
BY
Fraser, Myers & Manley
ATTORNEYS.

Patented July 28, 1936

2,048,744

UNITED STATES PATENT OFFICE 2,048,744

RESILIENT ATTACHING CLIP

Edmund D. Janes, Middlebury, Conn., assignor to Scovill Manufacturing Company, Waterbury, Conn., a corporation of Connecticut Application November 11, 1935, Serial No. 49,202

10 Claims. (Cl. 24—201)

This invention relates to fasteners and more particularly to an improved form of resilient attaching clip having a spring element which is adapted by its compression to hold two adjacently disposed parts in frictional engagement.

The principal object of the invention is to provide a simple inexpensive resilient type attaching clip which may readily be engaged with two adjacently disposed parts to hold them together, or easily removed therefrom so that the parts may be separated.

It is a further object of the invention to provide an attaching clip comprising a hooked member and a resilient member each of which may be separately manufactured at a minimum cost, and then assembled as a unit with the members disposed in such relation, one to another, that they may not accidentally become separated.

Other objects and various features of the invention making for efficiency in operation and economy in manufacture will be more apparent from the following description when made in connection with the accompanying drawing in which—

Figure 1:
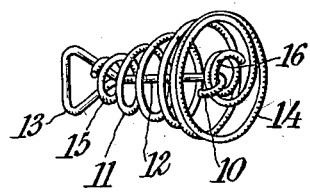
Figure 1 is a perspective view of the resilient fastener embodying the principles of my invention.

In general, an attaching clip of this type comprises a hook element which is adapted to engage one of two parts which are to be held together, a spring element which is adapted to engage the other of the parts, and a link which passes through an opening in one of the parts to connect the hook and the spring whereby the compression of the latter may force the two parts into frictional engagement.

In one embodiment of such a fastener (Figs. 1 and 2) the hook element 10 is disposed adjacent one end of a coiled wire spring 11, and the connection therebetween is formed by an extended stem portion 12 having a handle 13 which is adapted to engage the other end of the spring. Preferably the spring is of conical shape whereby the largest convolution 14 may form a stable base upon which the spring may rest, and its smallest convolution 15 may form a retaining ring against which the handle portion 13 may abut.

Further, although not necessarily essential, it is preferred, as shown, to form the hooked-stem, and the spring, as separate elements, because it has been found that this procedure obviates complicated bending operations, and hence results in a lessened manufacturing cost.

The attachment of two adjacently disposed articles by means of such a clip is accomplished by disposing the base 14 against one of them, and compressing the spring whereby the hook may be passed through the opening in the first article and engaged with the second one. Thereafter, of course, the articles will be held in frictional engagement by the compressive force of the spring.

The chief objection to such a fastener resides not in its function but in its application. Thus, since the fastener is formed in two separate parts, it is almost essential that the spring be compressed with one hand while the other hand is used to guide the stem and hook. An attempt to compress the spring by applying pressure to the handle will usually result in a skewing off of the parts. Similarly, considerable difficulty arises in attempting to register the clip with the opening in the article whereby the hook may be passed therethrough. Further, when such a fastener is not in use, the hook portion may tend to work its way out of the spring and become lost, thereby destroying any further usefulness of the device.

Figure 2:
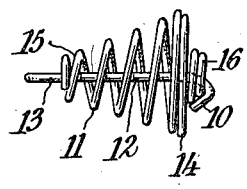
Fig. 2 is an elevational view of the fastener of Fig. 1.

These foregoing difficulties may be avoided by providing means which will maintain the stem centered with respect to the spring, means which will assist in obtaining a proper registry of the clip with the opening in one of the articles, and means which will maintain the parts, that is, the hook and the spring, constantly and securely engaged. In the preferred embodiment all of these functions are performed by a single means. Accordingly, as is shown in Fig. 1, the largest convolution 14 is extended inwardly and turned about the axis of the spring to form a centering ring 16 which projects beyond the largest convolution or bore 14. In the preferred embodiment this ring is of substantially the same diameter as is the retaining ring 15, and of slightly lesser diameter than the opening in the article with which it is to be used. Further, the centers of both rings are substantially coincident with the axis of the spring, and the distance between these rings slightly exceeds the length of the stem, that is, the distance between the hook and handle portions. Thus, when the stem is inserted into the spring, as shown in Figs. 1 and 2, the latter will be held in compression between the hook element and the handle; and consequently, the parts will be constantly engaged even though the clip is not in use. In applying the clip, it may be positioned against one of the articles approximately over the opening therein, and then moved about until the projecting centering ring slips into the latter; thus indicating that the clip is properly registered with the opening. Now when the spring is compressed, by pressing upon the handle portion, the ring will guide the stem and hook through the opening, and will, of course, prevent the part from going askew. From the foregoing it is apparent that the clip may be properly positioned and attached with one hand while the other is left free to hold the articles in the desired positional relation.

Figure 3:
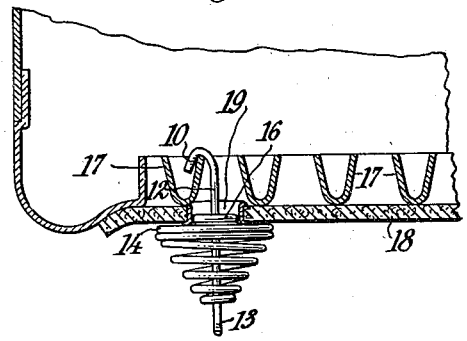
Fig. 3 is a sectional plan view of a fragment of a radiator assembly of an automobile illustrating one practical use to which the invention may be put.
Figure 4:
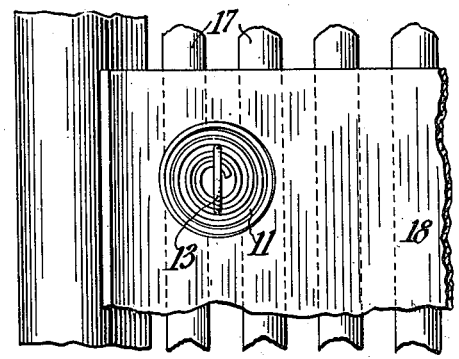
Fig. 4 is a front elevational view of the practical embodiment of Fig. 3.

The foregoing features, and advantages of such a fastener, may best be understood by considering a practical application of the fastener. Thus, Figs. 3 and 4 show an automobile radiator assembly having a plurality of bars 17 disposed over the front face thereof to form an ornamental grille. In winter, as is well understood, it is frequently desirable to cover the grille so as to dampen the flow of air therethrough. For this purpose a piece of felt or cardboard 18 is attached to the bars at one or more points. Now, the fastening means for such a cover must have certain essential qualifications. Thus, it must be extremely easy to apply, and it should not be subject to dislodgment by the continuous vibration incident to the operation of an automobile.

Figure 5:
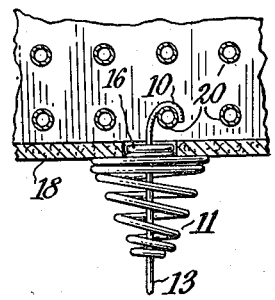
Fig. 5 is a sectional view of another type of automobile radiator assembly which illustrates a practical application of the invention.

The fastener hereinbefore described in connection with Figs. 1 and 2 answers these qualifications admirably. Accordingly, the cover may be attached very easily by holding it against the grille with one hand while the clip is applied with the other. The latter is done, of course, by disposing the base 14 against the cover, approximately over the opening 19 therein, and moving the clip about until the projecting centering ring 16, which is smaller than the opening, slips into the latter as is shown in Figs. 3 and 5. Then, by applying pressure to the handle the hook will be extended through the opening, and into a position to engage the rear side of one of the bars 17; or if the radiator has no grille, then with one of the tubes 20, as is shown in Fig. 5. Once the clip is properly engaged, it, being of the resilient type, will not be materially affected by the continuous vibration of the radiator, that is, it does not tend to become loosened by vibration as would a screw or other positive type fastener.

The advantages of such a fastener are manifold. From the point of view of the user, the fastener is very simple to apply and to remove; and when it is removed the parts will not separate one from the other and become lost. From the standpoint of the manufacturer, this fastener is extremely economical to make. Thus the spring and centering ring involve only the simplest of turning operations and may be made from a continuous piece of wire. Similarly, the manufacture of the hook and stem can be accomplished at minimum cost; that is, it may be made from a single piece of wire, or it may be stamped from sheet metal if desired. In either event the manufacturing operations are extremely simple. Similarly, this type of fastener provides definite advantages to the seller or distributor. In the latter case the constant engagement of the spring and hook elements prevents accidental disengagement, and thus the problem of having a number of springs and no stems, or vice versa, is almost entirely avoided.

Since certain changes may be made in the invention without in any way departing from the true scope thereof, it is intended that the foregoing shall be construed in a descriptive rather than in a limiting sense.

What I claim is:

1. A fastener comprising a conically coiled wire spring in which the largest convolution thereof is bent inwardly and provided with a terminal centering ring having its center substantially coincident with the axis of the spring, and a stem passing axially through said spring, said stem having an enlarged handle portion at one end and a hooked portion at the other end.

2. A fastener comprising a conically coiled wire spring in which the smallest convolution thereof forms a retaining ring, the largest convolution is adapted to serve as a base, and the end of the largest convolution is disposed about the axis of the spring to form a centering ring, and a stem passing axially through said spring and confined by said rings, said stem having a handle portion on the end which is adjacent the retaining ring and a hooked portion on the end which is adjacent the centering ring.

3. A fastener according to claim 2 in which the retaining and centering rings have their respective centers substantially coincident with the axis of the spring.

4. A fastener according to claim 2 in which the retaining and centering rings are of substantially the same diameter and have their respective centers coincident with the axis of the spring.

5. A fastener according to claim 2 in which the distance between the retaining and centering rings is normally greater than the distance between the hook and handle portions of the stem.

6. A fastener comprising a conically coiled wire spring of which the small convolution at one end is adapted to serve as a retaining ring, and the large convolution at the other end is adapted to serve as a base, the terminal of the large convolution being extended inwardly and coiled about the axis of the spring to form a centering ring, and a stem passing axially through the spring, said stem having a handle portion at one end which abuts against the retaining ring and a hooked portion at the other end which engages the centering ring when the coil spring is partially compressed.

7. A device for fastening together two adjacently disposed articles one of which has an opening therein comprising a conically coiled wire spring of which the small convolution at one end thereof is adapted to serve as a retaining ring, the large convolution at the other end thereof is adapted to serve as a base, a centering ring disposed adjacent said base and constituting an extension thereof, said centering ring having its axis substantially coincident with the axis of the spring, and a stem passing axially through said spring, said stem having an enlarged portion abutting against the retaining ring of the spring and a hooked portion engaging the centering ring when the spring is partially compressed whereby when the spring is further compressed the hooked portion may be passed through the opening in one of the articles and engaged with the other article so that they may thereafter be held together by the force exerted by the compression of the spring.

8. A clip for fastening together two adjacently disposed articles one of which has an opening therein through which a part of the clip may pass comprising a coiled wire spring having a convolution at one of its ends which is adapted to serve as a base, and which projects axially having a centering ring beyond the base, and a stem disposed axially of the spring and having a hooked portion on one end which is engaged with the centering ring when the coil spring is partially compressed, said stem being adapted to transmit the compressive force of the spring to the hooked portion, said centering ring being of slightly lesser diameter than the opening in the article whereby it may be fitted therein properly to align the spring and hooked portion with the opening.

9. A clip for fastening together two adjacently disposed articles one of which has an opening therein through which a part of the clip may pass comprising a conically coiled wire spring having a centering ring formed adjacent its largest convolution and projecting therefrom, and a stem disposed axially of the spring having a hooked portion which is normally in engagement with the centering ring, said stem being adapted to transmit the compressive force of the spring to the hooked portion, said centering ring being of slightly lesser diameter than the opening in the article whereby it may fit into the latter to align the spring and hooked portion with the opening.

10. A clip for fastening together two adjacently disposed articles one of which has an opening therein through which a part of the clip may pass comprising a conically coiled wire spring of which the small convolution at one end is adapted to serve as a retaining ring, and the large convolution at the other end is adapted to serve as a base, a centering ring disposed about the axis of the spring and projecting from said base, and a stem passing axially through the spring, said stem having an enlarged handle at one end thereof which normally abuts against the retaining ring and a hooked portion at the other end which is normally engaged with the centering ring by the compressive force of the spring, said centering ring being of slightly lesser diameter than the opening in the article with which it is to be used whereby it may be fitted into the latter properly to align the spring and hooked portion with the opening.

EDMUND D. JANES.